United States Patent
Billiet

(10) Patent No.: US 10,441,913 B2
(45) Date of Patent: Oct. 15, 2019

(54) END CAP FOR AN ASSEMBLY USED IN THE PREPARATION OF COMPRESSED GAS

(71) Applicant: Norgren Limited, Staffordshire (GB)

(72) Inventor: Colin Billiet, Gateshead Tyne & Wear (GB)

(73) Assignee: Norgren Limited, Staffordshire (GB)

( * ) Notice: Subject to any disclaimer, the term of this patent is extended or adjusted under 35 U.S.C. 154(b) by 529 days.

(21) Appl. No.: 15/100,819

(22) PCT Filed: Dec. 2, 2014

(86) PCT No.: PCT/GB2014/053578
§ 371 (c)(1),
(2) Date: Jun. 1, 2016

(87) PCT Pub. No.: WO2015/082906
PCT Pub. Date: Jun. 11, 2015

(65) Prior Publication Data
US 2016/0288042 A1    Oct. 6, 2016

(30) Foreign Application Priority Data

Dec. 2, 2013  (GB) .................................. 1321236.0
May 9, 2014  (GB) .................................. 1408227.5

(51) Int. Cl.
| | | |
|---|---|---|
| B01D 53/04 | (2006.01) | |
| B01D 46/00 | (2006.01) | |
| B21C 23/08 | (2006.01) | |

(52) U.S. Cl.
CPC ..... B01D 53/0415 (2013.01); B01D 46/0004 (2013.01); B21C 23/085 (2013.01);
(Continued)

(58) Field of Classification Search
None
See application file for complete search history.

(56) References Cited

U.S. PATENT DOCUMENTS 6,440,201 B1 *  8/2002  Billiet ................ B01D 46/0004
                                                     55/476
8,211,219 B2 *  7/2012  Schuster ............ B01D 46/0004
                                                     96/421
(Continued)

FOREIGN PATENT DOCUMENTS

| WO | 9930799 A1 | 6/1999 |
|---|---|---|
| WO | 2009012010 A1 | 1/2009 |
| WO | 2010097614 A2 | 9/2010 |

*Primary Examiner* — Amber R Orlando
*Assistant Examiner* — Brit E. Anbacht
(74) *Attorney, Agent, or Firm* — The Ollila Law Group LLC

(57) ABSTRACT

An End Cap for an Assembly Used in the Preparation of Compressed Gas An end cap for attaching to one or more filter elements and respective filter bowls is disclosed. The end cap has a tubular body formed by extrusion and this body has a series of apertures formed therein. The apertures include an end aperture for attachment to a filter bowl and another end aperture for attachment to another filter bowl or to a sealing disc. The body also has a pair of sidewall apertures to act as inlet and outlet the filter assembly. The end cap also has a plastic insert for insertion into the body, the insert having a conduit portion for directing a stream of gas from the inlet to a filter element through one of the end apertures.

19 Claims, 16 Drawing Sheets

(52) U.S. Cl.
CPC .. *B01D 2201/291* (2013.01); *B01D 2201/293* (2013.01); *B01D 2253/102* (2013.01); *B01D 2265/05* (2013.01)

(56) References Cited

U.S. PATENT DOCUMENTS

| | | | |
|---|---|---|---|
| 8,337,582 B2* | 12/2012 | Feisthauer | B01D 46/0005 210/437 |
| 2007/0084785 A1* | 4/2007 | Schuster | B01D 45/18 210/435 |
| 2010/0058723 A1 | 3/2010 | Feisthauer et al. | |
| 2010/0058930 A1* | 3/2010 | Schuster | B01D 46/0004 96/421 |
| 2015/0128546 A1* | 5/2015 | Walker | B01D 46/0004 55/502 |

\* cited by examiner

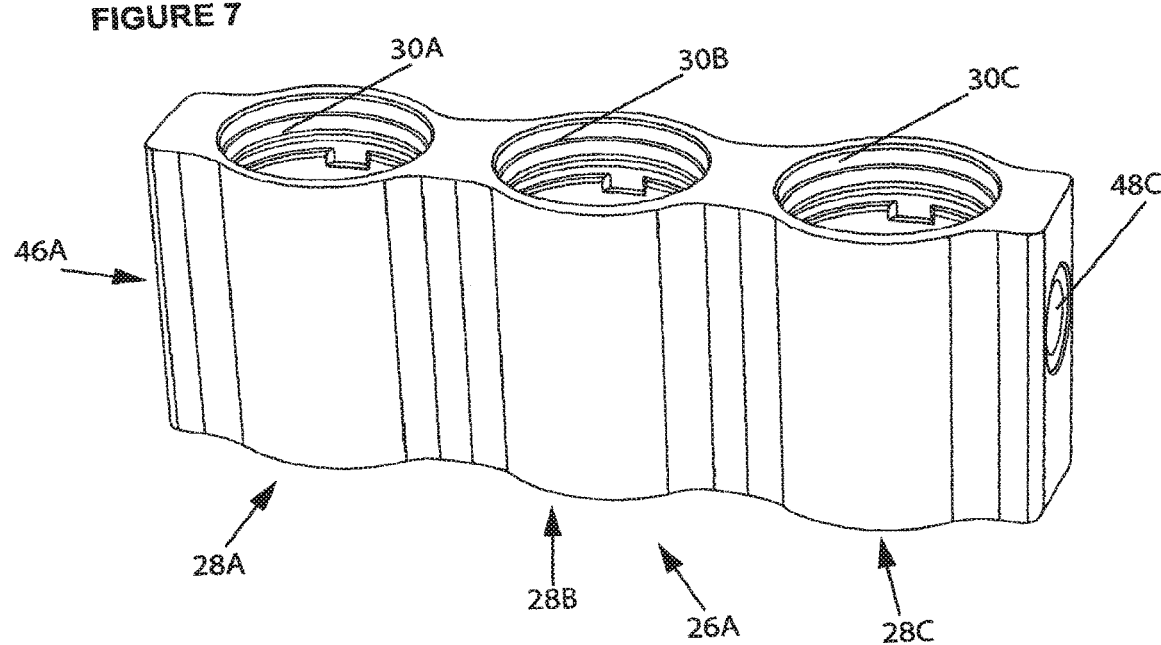
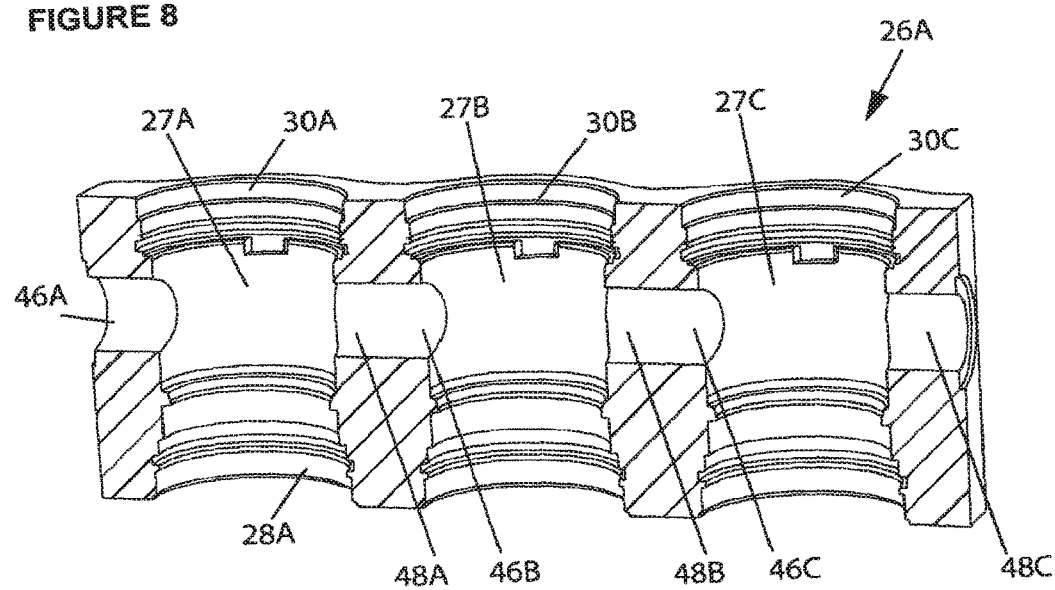

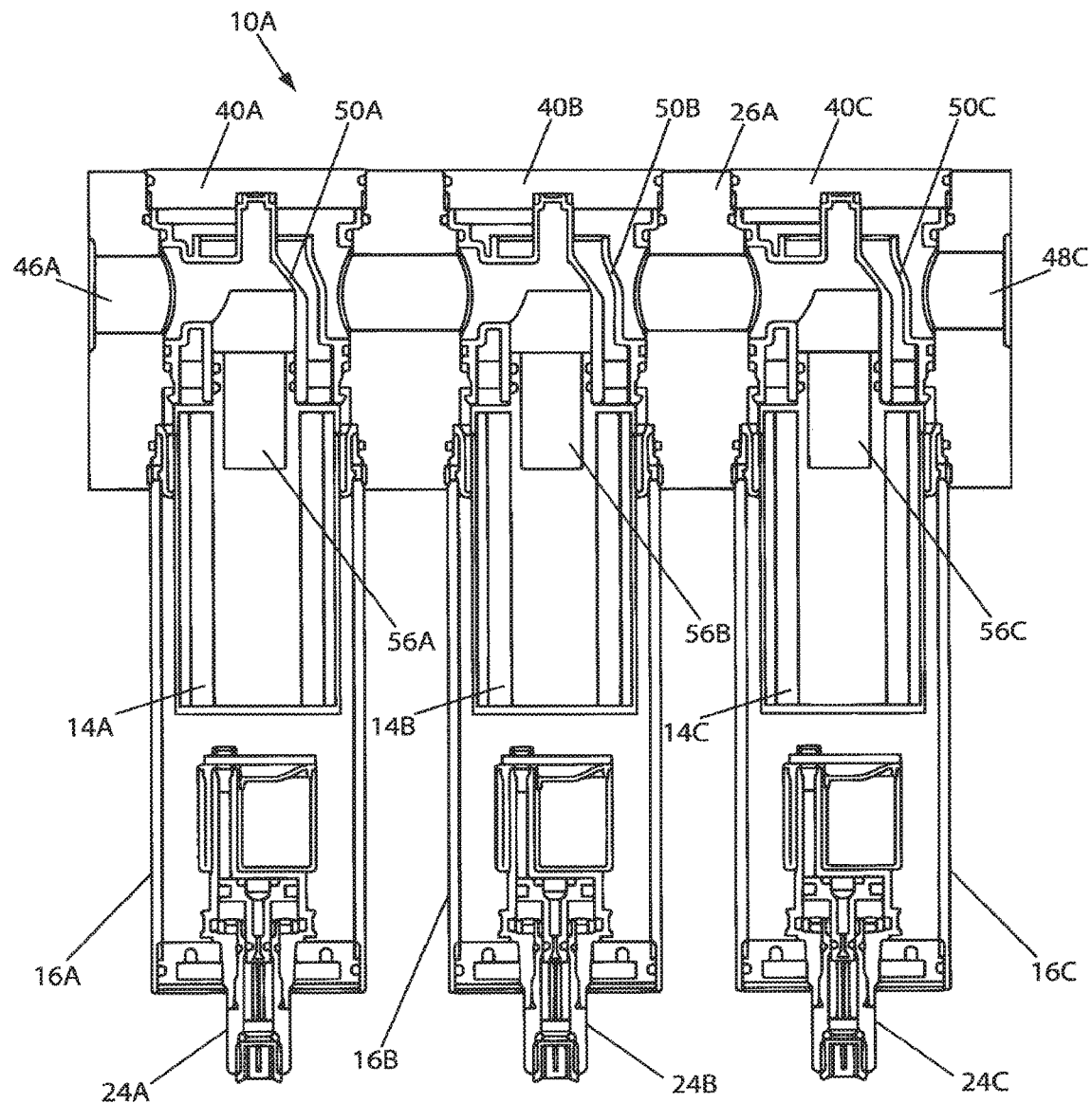

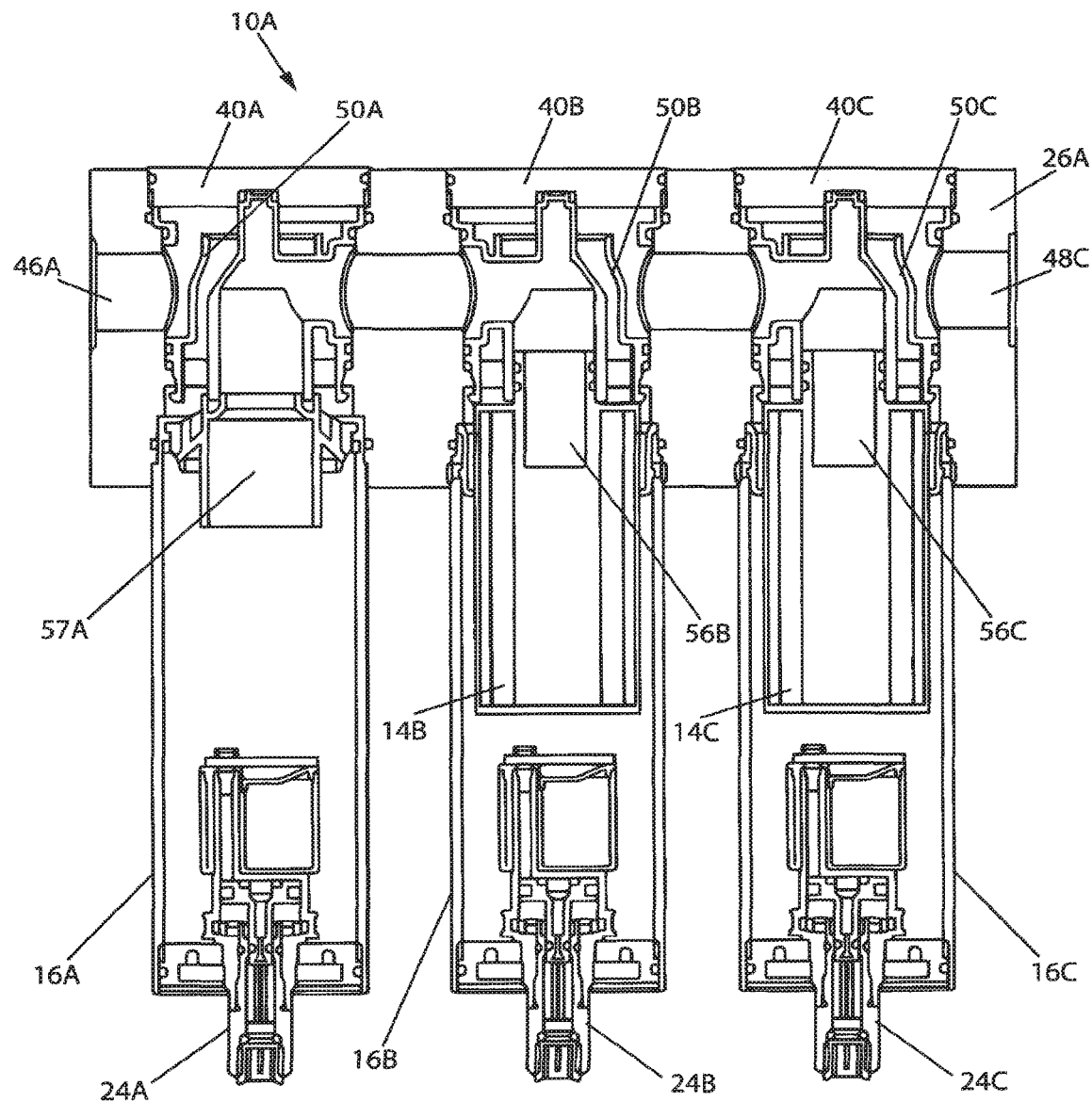

END CAP FOR AN ASSEMBLY USED IN THE PREPARATION OF COMPRESSED GAS

TECHNICAL FIELD

The present invention relates to an end cap for an assembly used in the preparation of compressed gas, and relates particularly, but not exclusively, to an end cap in a filter used in the treatment of compressed air.

BACKGROUND

It is a commonplace requirement in the production and use of compressed air that the air coming directly from the compressor is unsuitable for use. It is therefore equally commonplace for preparation techniques to be applied to the compressed gas before it is used. For example, the pressure of the gas may be varied using a regulator, a lubricating oil may be added and the air may be cleaned and dried after compression and before it is used. An example of drying techniques employed include pressure swing adsorption (PSA) where the compressed air is passed through a drying media contained in a drying vessel under high pressure. The drying media is then regenerated by decreasing the pressure in the drying vessel and a small quantity of the dry air is passed back through the media at reduced pressure thereby removing moisture resulting in regeneration.

Prior to drying it is also commonplace for the compressed air to be passed through a filter to remove aerosol particles, such as micro droplets of oil, and excess water in droplet form. One type of these filters, which is commonly used, has three major components: an end cap; a filter element (or cartridge); and a filter bowl. The end cap and filter bowl form the pressure containing external components of the filter housing and since they receive compressed air under pressure are operating with a large pressure differential between their inside and outside surfaces. Typically compressed air at up to 20 bar g (above the external atmospheric pressure) is experienced between the internal and external surfaces of the end cap, although more typically in the range 6 to 10 bar g. The end cap is a complex component generally formed by casting whereas the filter bowl has a tubular body sealed with a base lid. For smaller filter bowls (up to around 10 cm diameter) the bowl is generally formed by casting. However, for larger bowl sizes, the tubular body of the bowl is most commonly formed by extrusion. The extruded Aluminium is significantly less porous than a cast product which often requires impregnation to seal it to make it useable with compressed air. Furthermore, when testing for certification marks (e.g. a Canadian Registration Number) in some jurisdictions, the testing applied to extruded products is different or much less stringent that those applied to cast products. The approval process for casting is significantly more complex due to the increased likelihood of imperfections (typically small pores formed by gas bubbles dissolved in the molten metal) in the internal structure of the casting.

Preferred embodiments of the present invention seek to overcome the above described problems with the prior art.

BRIEF SUMMARY

According to an aspect of the present invention there is provided an end cap for an assembly used in the preparation of compressed gas, the end cap comprising:

a substantially tubular body portion formed by extrusion, said body portion having a plurality of apertures formed therein, the apertures including a first end aperture for attachment to a first gas preparation component, a second end aperture for attachment to a second gas preparation component or to at least one sealing device and first and second sidewall apertures for acting as an inlet and an outlet for said filter assembly; and at least one insert for location in said body portion between said first and second end apertures and having a first conduit portion for directing a stream of gas from said inlet to said first component through said first end aperture.

By providing an end cap having an extruded body portion and an insert to create a conduit between the inlet and the gas preparation component (typically a filter element), the advantage is provided that where small runs of a product are to be made the cost of production is significantly less than if the product was to be produced by casting. Furthermore, the cost of finishing the product is less with an extruded body than it would be if the body portion was formed by casting. For example, the extrusion does not have the difficulties of being porous after the product has been first formed, a problem that is exacerbated when machining cuts into the skin of the casting revealing the more porous interior. With a product formed by casting it is often necessary to perform a further step of impregnation to seal the initially formed product. Any manipulation of the product, for example the forming of holes and possibly threads in those holes by machining, that breaks through the surface skin of typically 0.75 mm thickness, also requires sealing.

High tensile aluminium has a universal chemical makeup and its tensile strength is consistent unlike the variability found in castings. Furthermore, tooling (the making of the extrusion tool) for extrusion is much lower in cost than for producing the equivalent product using casting. For example, in the case of an end cap it is often the case that one size of end cap, that is an end cap designed to work with a specific size of the filter element and filter bowl, can need to receive an inlet or an outlet of different sizes. In other words the inlet and outlet diameters are not standard for any one size of the end cap. As a result, when an end cap of a given size is produced by casting is necessary to have a series of casting tools produced with each of the different diameter of inlet and/or outlet preformed therein. However, when an end cap is produced by extrusion it is always necessary to form the inlet and/or outlet by forming the threaded aperture using a machine tool. This technique is not possible with casting since the aperture and thread must be formed by the casting and are only finished off by machining once the and cap is formed. This has the further advantage that the stock that it is necessary to hold, in order to be able to quickly supply a customer with the end cap that they require, is significantly reduced. For each size of end cap it is only necessary to have extruded products formed in that size and the inlet and outlet apertures can be machined into the extruded product at the size required once an order has been placed. This also reduces the lead time for supplying products.

It is also the case that the insert, which is contained within the body portion, can be formed from a material such as plastic. Using extruded aluminium is particularly useful for the body portion as this is an excellent material at with standing high internal pressure, which leads to significant pressure differentials between the inside and outside of the filter assembly. For example, it is typically the case that the pressure of compressed air within the end cap is 11 bar a, therefore being a significantly higher pressure than outside the end cap, at atmospheric pressure. There is therefore a 10 bar difference between the inside and outside of the end cap and extruded aluminium is more than capable of handling this pressure. In contrast, all of the air within the filter element and end cap is at approximately the same pressure of 11 bar a. As a result, the pressure differential between one portion of the insert and another is usually 200 mbar but may be up to 1 bar and there is therefore very little likelihood of cross contamination between the pre- and post-filtered streams of compressed air. As a result, plastic can be used to form the insert and conduit portions. It is also the case that extruded aluminium products are more easily anodised than a cast products giving both internal and external protection to surfaces as well as producing a more aesthetically pleasing product. Furthermore, extruded products have a lower rejection rate than cast products and in particular threads formed into an extruded aluminium product form better seals than equivalent cast products.

The insert may further comprise a second conduit portion for directing a stream of gas from a second gas preparation component through said second end aperture to said outlet when said end cap is attached to said second gas preparation component.

The insert may also further comprise at least a portion for directing said stream of gas, having passed through said first gas preparation component, from adjacent said first gas preparation component in a direction away from said first gas preparation component, said second conduit portion comprising a conduit wall extending at least partially beyond said outlet in said direction.

By providing a second conduit portion including a conduit wall that extends beyond the outlet, the advantage is provided that a more even flow of air exits the filter element. It is therefore less likely that there are high-speed spots where the velocity of the stream of air is significantly higher than in other areas.

In a preferred embodiment an edge of said conduit wall, distal of said first gas preparation component, engages said second gas preparation component.

In another preferred embodiment at least a portion of said conduit wall is annular.

In a further preferred embodiment the insert comprises at least one plastic material.

The insert may also comprise fixing members for fixing said insert into said body.

In a preferred embodiment the body portion comprises first and second internally threaded portions adjacent said first and second end apertures and adapted to engage externally threaded portions of said gas preparation component or sealing device.

By having threads on both the first and second end apertures provides the advantage that the same body portion can be used to create an end cap for a filter assembly that contains two filter elements (one on either side of the end cap) or a filter assembly that contains one filter element (with the other aperture being sealed by a threaded disc).

A portion of said first conduit extends around said inlet and/or a portion of said second conduit extends around said outlet.

The first and/or second components may comprise at least one filter bowl and at least one filter element.

According to another aspect of the present invention there is provided an end cap for a filter assembly, the end cap for attaching to at least one filter element and at least one filter bowl, the end cap comprising:

a body portion having a plurality of apertures formed therein, the apertures including a first end aperture for attachment to a first filter bowl, a second end aperture for attachment to a second filter bowl or at least one sealing device and first and second sidewall apertures for acting as an inlet and an outlet for said filter assembly;

at least one first conduit portion for directing a stream of gas from said inlet to a first filter element through said first end aperture; and at least one second conduit portion for directing said stream of gas, having passed through said first filter element, from adjacent said first filter element in a direction away from said first filter element, said second conduit portion comprising a conduit wall extending at least partially beyond a portion of said outlet in said direction.

By having a second conduit portion that receives the filtered air and directs it away from the first filter element and has a wall that extends beyond at least the bottom of the outlet provides the advantage that the flow of filtered air has a more consistent speed than is seen in filters of the prior art. Because all the filtered air must go up over the wall it is less likely that there will be significant variations in the speed of the air stream in the annular gap between the filter element of the filter bowl, in particular adjacent the filter element. This will improve the filtering process by more evenly distributing the flow of air across the whole filter element.

In a preferred embodiment the conduit wall extends at least partially beyond said outlet.

By having the conduit wall extend beyond the outlet it ensures that the air must move upwards and then change directions through roughly 180° ensuring that the flow of air across the filter is substantially even removing any fast spots from the air stream leaving the filter element.

In a preferred embodiment an edge of said conduit wall, distal of said first filter element, engages said second filter element.

In another preferred embodiment at least a portion of said conduit wall is annular.

In a further preferred embodiment the body portion is substantially tubular and is formed by extrusion.

The first and second conduit portions may be formed as an insert comprising one or more components separate from said body portion.

The insert may comprise at least one plastic material.

The insert may also comprise fixing members for fixing said insert into said body.

In a preferred embodiment the second conduit portion directs a stream of gas from said second filter element through said second end aperture to said outlet when said end cap is attached to said second filter bowl.

In another preferred embodiment the body portion comprises first and second internally threaded portions adjacent said first and second and apertures and adapted to engage externally threaded portions of said filter bowl or sealing device.

According to another aspect of the present invention there is provided an end cap for an assembly used in the preparation of compressed gas, the end cap comprising:

a body portion comprising a plurality of openings, at least a plurality of said openings having respective inlets and outlets and at least one outlet of one opening leading to an inlet of an adjacent opening;

at least one insert for location in at least one said opening, the or each insert having a first conduit portion for directing a stream of gas from a respective said inlet to a first gas preparation component.

By providing a body with a plurality of openings linked by inlets and outlets and a plurality of inserts located in the openings, the advantage is provided that a filter apparatus can be formed containing multiple filters from a simple component in the form of an end cap. This end cap can be formed by simple extrusion or casting processes. The single end cap provides a rigid support that can be easily attached to other devices thereby supporting the filter apparatus. Furthermore, by replacing separately formed and then connected end caps with a single end cap which can receive multiple components, the advantage is provided that the places where leaks may occur is reduced.

In a preferred embodiment the body portion is formed by extrusion, said openings comprises apertures extending through said extruded body portion and said inlets and outlets are machined into said extruded body portion.

In another preferred embodiment the apertures comprises a first end aperture for attachment to respective first gas preparation component, a second end aperture for attachment to respective second gas preparation components or to respective sealing devices.

The insert may further comprise a second conduit portion for directing a stream of gas from a second gas preparation component through said second end aperture to said outlet when said end cap is attached to said second gas preparation component.

In a further preferred embodiment the body portion is formed by casting.

In a preferred embodiment the opening comprises a recess formed in said cast body portion.

The insert may further comprise at least a portion for directing said stream of gas, having passed through said first gas preparation component, from adjacent said first gas preparation component in a direction away from said first gas preparation component, said second conduit portion comprising a conduit wall extending at least partially beyond said outlet in said direction.

In a preferred embodiment an edge of said conduit wall, distal of said first gas preparation component, engages said second gas preparation component.

In another preferred embodiment at least a portion of said conduit wall is annular.

In a further preferred embodiment the insert comprises at least one plastic material.

The insert may comprise fixing members for fixing said insert into said body portion.

A portion of said first conduit may extend around said inlet and/or a portion of said second conduit extends around said outlet.

The first and/or second components may comprise at least one filter bowl and at least one filter element.

According to an aspect of the present invention there is provided an assembly used in the preparation of compressed gas, the assembly comprising:

an end cap substantially as set out above; and
at least one compressed gas preparation component.

At least one said compressed gas preparation component comprises: at least one filter element; and at least one filter bowl.

According to another aspect of the present invention there is provided an apparatus for treating a compressed gas, the apparatus comprising:

a filter assembly substantially as set out above; and
a pressure swing adsorption device for treating said gas.

According to a further aspect of the present invention there is provided a gas treatment assembly, for treatment of a compressed gas, the assembly comprising:

a substantially tubular media containing portion for containing at least one gas treatment media;
a plurality of end caps for enclosing ends of said tubular media containing portion, said end caps providing an inlet and an outlet to said assembly and wherein at least one end cap comprises a substantially tubular body portion formed by extrusion and adapted at a first end of said body to engage and form a seal with said media containing portion and further comprises a closure adapted to engage and seal with a second end of said body.

By providing an end cap formed by extrusion for a gas treatment assembly, the advantages described above for an end cap of a filter assembly equally apply.

In a preferred embodiment at least one of said inlet and said outlet is provided in said tubular body portion.

In another preferred embodiment at least one of said inlet and said outlet is provided in said closure.

In a further preferred embodiment the tubular body portion comprises at least one first thread for engaging a respective thread formed in said filter media containing portion.

The tubular body portion may comprise at least one second thread and said closure comprises a third thread, said second and third threads adapted to engage each other.

The assembly may further comprise at least one conduit insert for directing a stream of fluid entering said inlet to said filter media containing portion.

The assembly may also further comprise at least one filter media contained within said media containing portion.

According to another aspect of the present invention there is provided a method of forming an end cap for an assembly used in the preparation of compressed gas, comprising the steps: forming by extrusion a substantially tubular body portion;

machining into said body portion a plurality of apertures including a first end aperture for attachment to a first gas preparation component, a second end aperture for attachment to a second gas preparation component or to at least one sealing device and first and second sidewall apertures for acting as an inlet and an outlet for said filter assembly; and inserting through said first end aperture and locating in said body portion between said first and second end apertures at least one insert having a first conduit portion for directing a stream of gas from said inlet to said first component through said first end aperture.

The method may further comprise locating a sealing device in one of said end apertures.

Preferred embodiments of the present invention will now be described with reference to the accompanying drawings, in which:

BRIEF DESCRIPTION OF THE DRAWINGS

FIG. 7 is a perspective view of a component of an end cap of another embodiment of the present invention;

FIG. 8 is a sectional perspective view of the component of FIG. 7;

FIG. 10A is a sectional view of the filter device of FIG. 9;

FIG. 10B is a sectional view through a variation of the filter device shown in FIG. 9;

DETAILED DESCRIPTION

Figure 1:
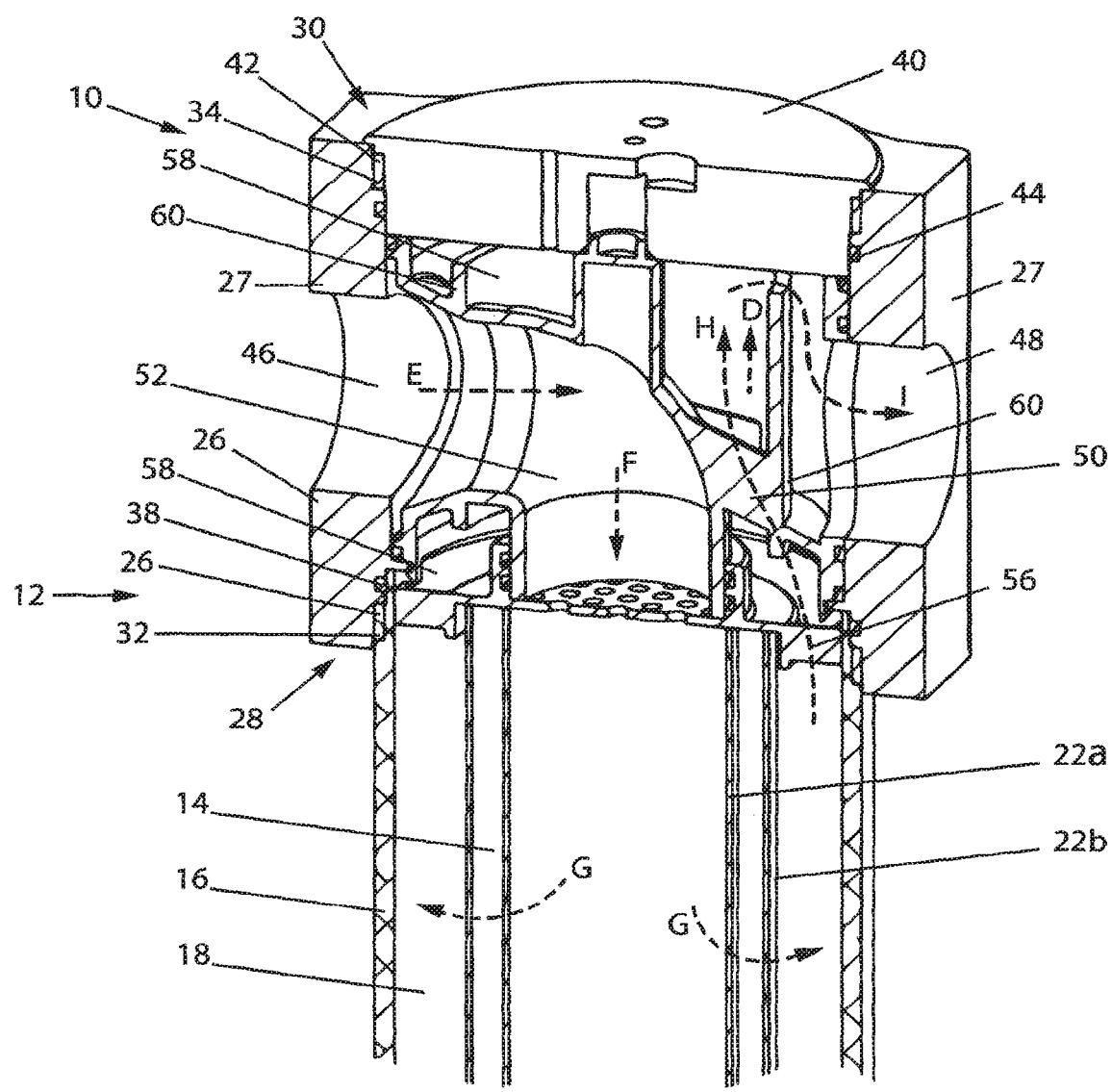
FIG. 1 is a sectional perspective view of a filter incorporating an end cap of the present invention.
Figure 2A:
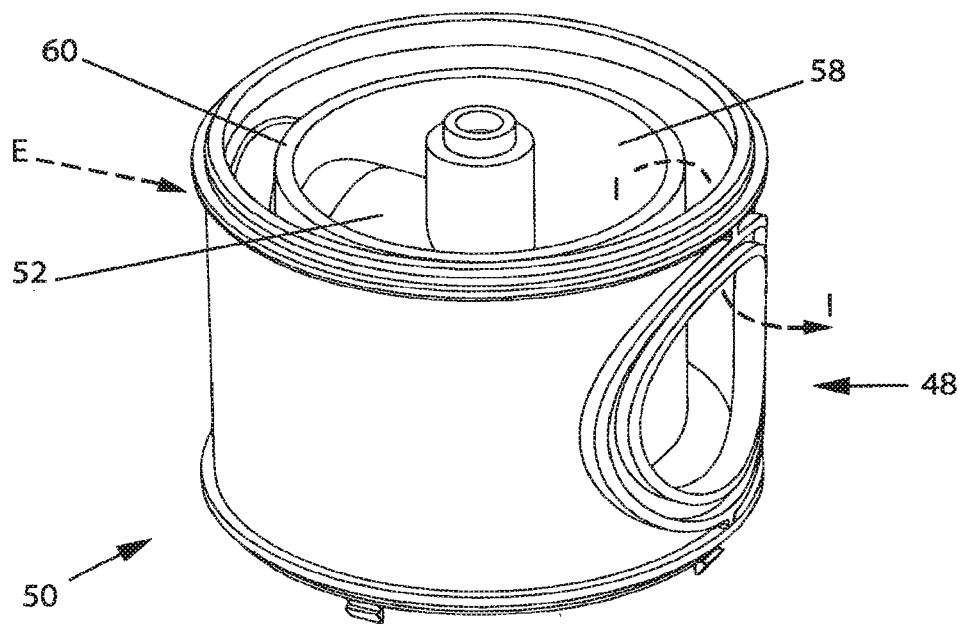
FIGS. 2A and 2B are plan and perspective views of an insert forming part of the filter of FIG. 1.
Figure 2B:
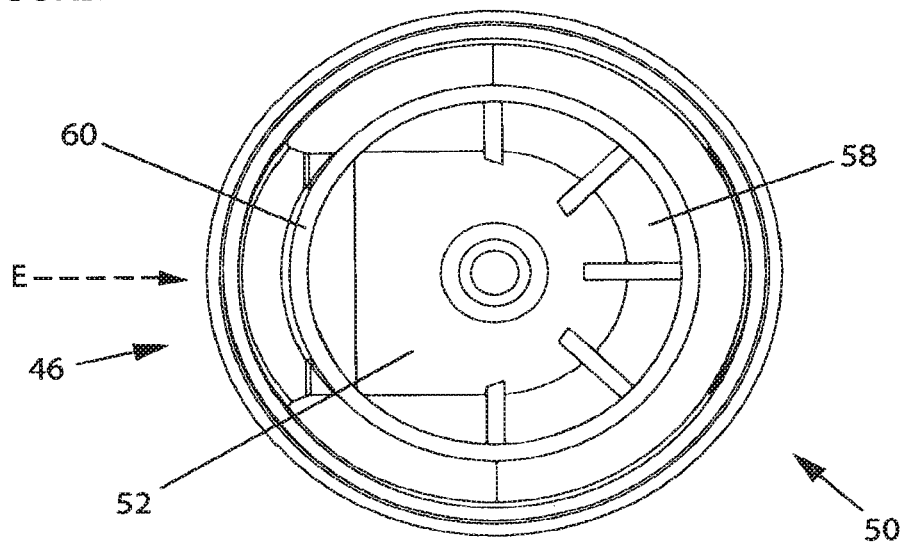

Referring to FIGS. 1 to 4 an end cap 10 is provided as part of an assembly 12 which is used in the preparation of compressed gas. In this embodiment the preparation technique being applied to the compressed gas is filtration. The end cap 10 is for attaching to a gas preparation component which includes a filter element 14 that is contained within a filter bowl 16. The filter bowl 16 has a bowl body 18 that terminates in a bowl sealing cap 20 (not shown in FIG. 1 but visible in FIG. 6). The filter element 14 is formed from a pair of tubular porous filter walls 22a and 22b, in the form of a pair of stainless steel perforated cylinders, which contain a filter material therebetween. Examples of the filter material include borosilicate microfibre (pleated or wrapped), non-woven polyester felt, activated carbon paper/cloth/granules. Filter element 14 also terminates with a filter sealing cap 24 (also shown in FIG. 6).

The end cap 10 has a substantially tubular body portion 26 that is formed by extrusion. The body portion 26 is preferably formed from aluminium although can be formed from any other suitable excludable metal or alloy. Although body portion 26 is tubular it should be noted that in the embodiment shown, the body portion is not cylindrical as its walls have thickened portions 27. Body portion 26 has a plurality of apertures formed therein including first and second end apertures 28 and 30. The end apertures 28 and 30 are formed as part of the extrusion process and both end apertures are aligned with each other axially in the direction of extrusion. Each of the first and second end apertures 28 and 30 has an internal thread indicated at 32 and 34 respectively.

In the embodiment shown in FIG. 1 the first end aperture 28 is attached to filter bowl 16 which has an external thread 36 that engages internal thread 32 and seals the body portion 26 of end cap 10 to filter bowl 16 by the inclusion of an O-ring 38. Also in this embodiment the second end aperture 30 is attached to a sealing device in the form of sealing plate 40. The sealing plate 40 has an external thread 42 that engages internal thread 34 of aperture 30 thereby sealing the aperture 30 with sealing plate 40 and using an O-ring 44.

Body portion 26 has two further apertures which are machined into the sidewall of the body portion after its formation by extrusion has taken place. These sidewall apertures form an inlet 46 and an outlet 48 in the thickened wall portions 27 of body portion 26 of end cap 10.

End cap 10 has an insert 50 that includes a first conduit 52 that directs air from inlet 46 into the central portion of filter element 14. Insert 50 is preferably formed by moulding of a plastic material. The insert 50 includes the first conduit 52 and engages a filter element support portion 56 that is connected to the filter element 14. The insert 50 has a second conduit 58. In the embodiment shown in FIG. 1, the second conduit is the path along which air that has passed through filter element 14 passes to get to outlet 48. Second conduit 58 is partially defined by conduit wall 60 which extends from adjacent the first filter element 14 and preferably to beyond the outlet 48 in the direction D that the compressed air is travelling on leaving filter bowl 16. This conduit wall 60 causes all of the compressed air to travel in the same direction D after passing through the filter element 14. Only when it has passed beyond the outlet 48 can the stream of air pass over conduit wall 60, change direction moving in a direction opposite to direction D and pass towards outlet 48. As a result of conduit wall 60, after the stream of compressed air is passed through filter element 14, there are no high-speed areas resulting in more even use of the filter element 14.

Figure 4A:
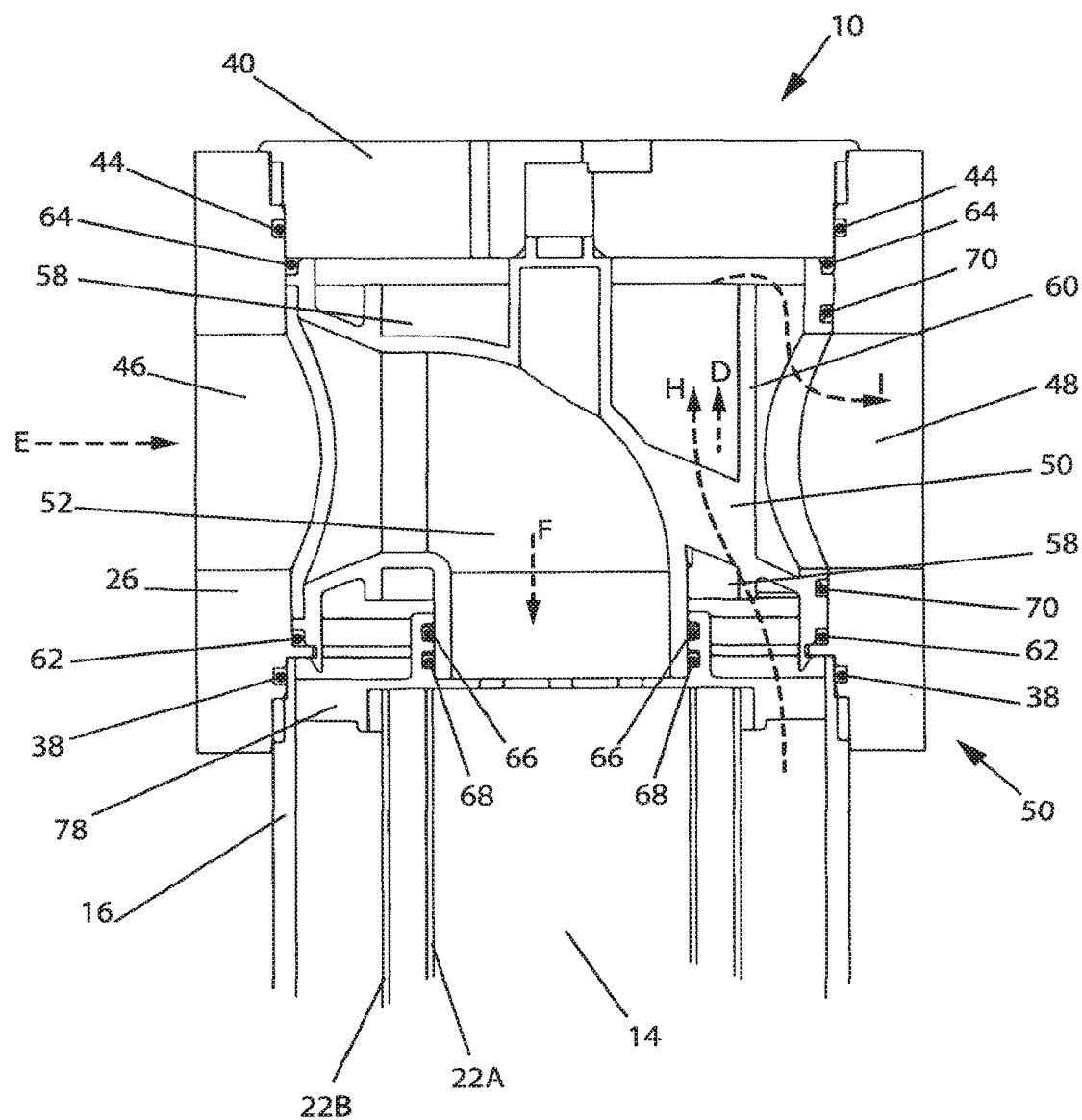
FIG. 4A is a sectional view of the filter of FIG. 1.

Referring to FIG. 4A, it can be seen that a series of O-rings are used to seal the various components that make up the end cap 10 relative to each other. For example, O-rings 62 and 64 seal the insert 50 relative to the body portion 26. O-rings 66 and 68 seal the insert 50 relative to the filter element support portion 56. Each of these O-rings 62, 64, 66 and 68, as well as the previously mentioned O-rings 38 and 44, are aligned coaxially with the filter element 14, filter body 16 and the direction in which the body portion 26 is extruded. This makes these O-rings easy to insert since they are coaxial with the direction in which the insert 50 is inserted into body portion 26. One further ring 70 is also provided and this extends around outlet 48 and is coaxial with outlet 48, which is it is perpendicular to the other O-rings previously described. It should be noted that there is no equivalent O-ring required around the inlet 46.

Figure 3:
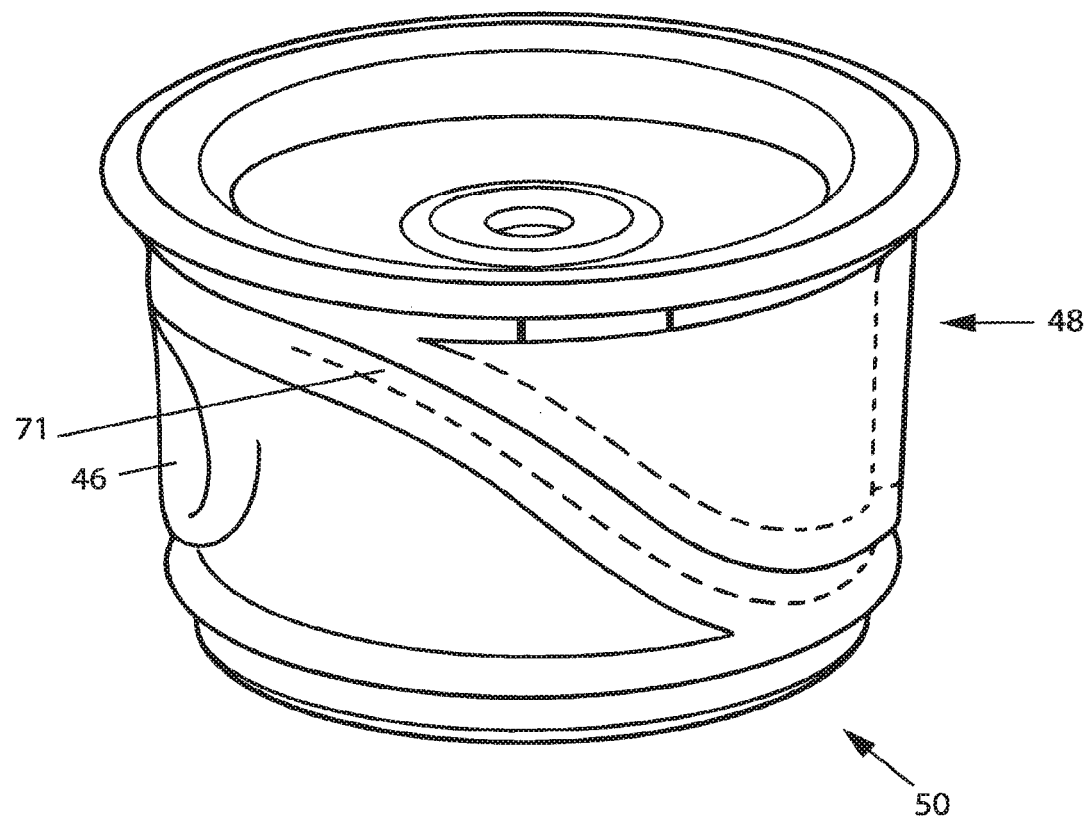
FIG. 3 is a perspective view of an insert of another embodiment of the present invention.
Figure 4B:
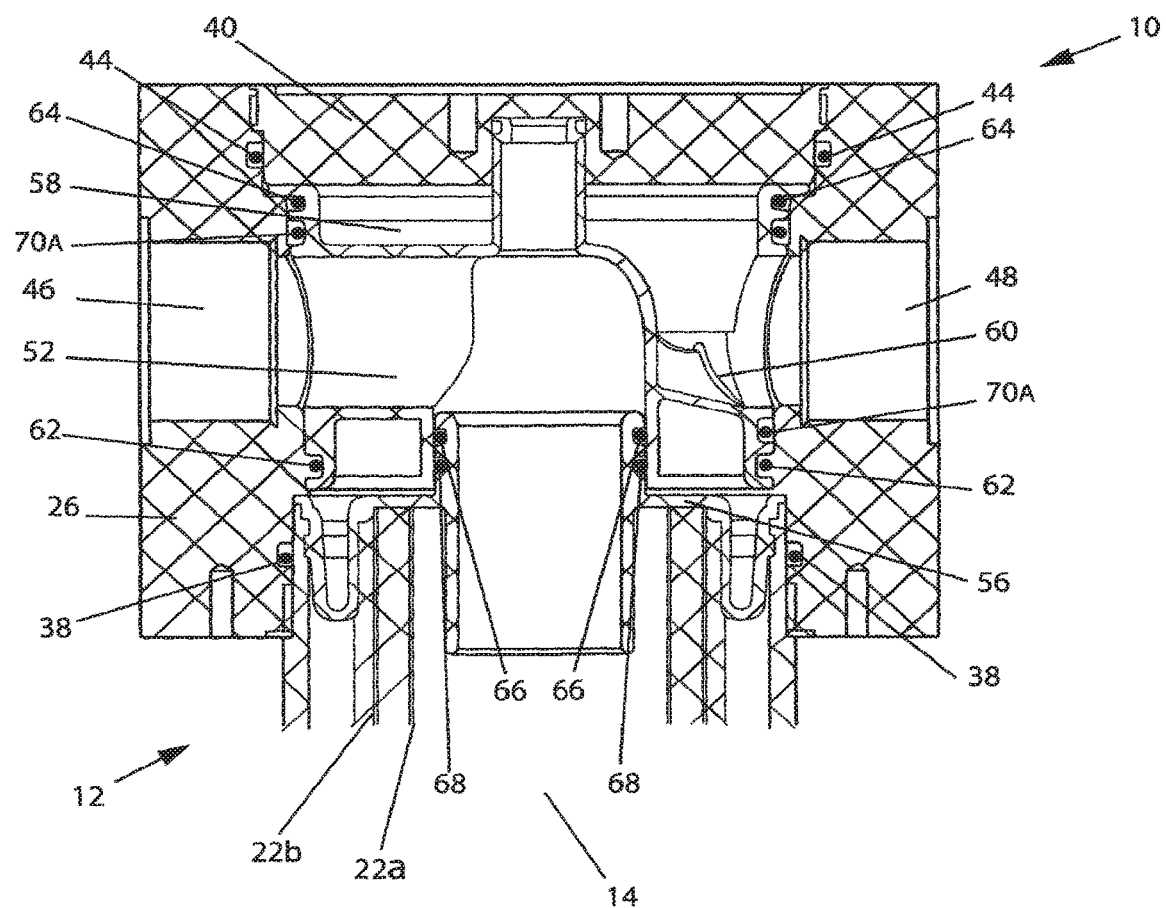
FIG. 4B is a sectional view of a portion of a filter of another embodiment of the present invention.

An alternative embodiment is shown in FIG. 4B and in this illustration functionally equivalent components have been given the same reference numerals. The most significant difference between the embodiment shown in FIG. 4a and the embodiment shown in FIG. 4B is that the insert 50 is formed with a slight taper which matches a taper in the body portion 26. This taper is formed in the body portion 26 by machining after the extrusion process is completed such that the wider portion is at the top and the narrow portion is at the bottom. As a result, the insert 50 is placed into the body portion 26 from the top and the sealing plate 40 is placed on top of the insert 50. The insert 50 is therefore completely fixed and sealed within the body portion 26 therefore ensuring that it does not move which in turn assist in maintaining the integrity of the various O-ring seals which seal the insert 50 relative to the body portion 26. This alternative insert 50 is also shown in FIG. 3 and from this figure it can be seen that an additional channel 71 is included. This channel 71 receives the O-ring seal 70A and replaces the channel around the outlet 48 which received the O-ring seal 70 (see FIGS. 2A and 2B). It can also be seen from FIG. 4B that the O-ring seal 70A extends from above the inlet 46 to below the outlet 48. A further difference between the embodiment shown in FIG. 4A and that in FIG. 4B is that the conduit wall 60 is somewhat shorter in FIG. 4B only extending approximately halfway up the outlet 48.

Figure 5:
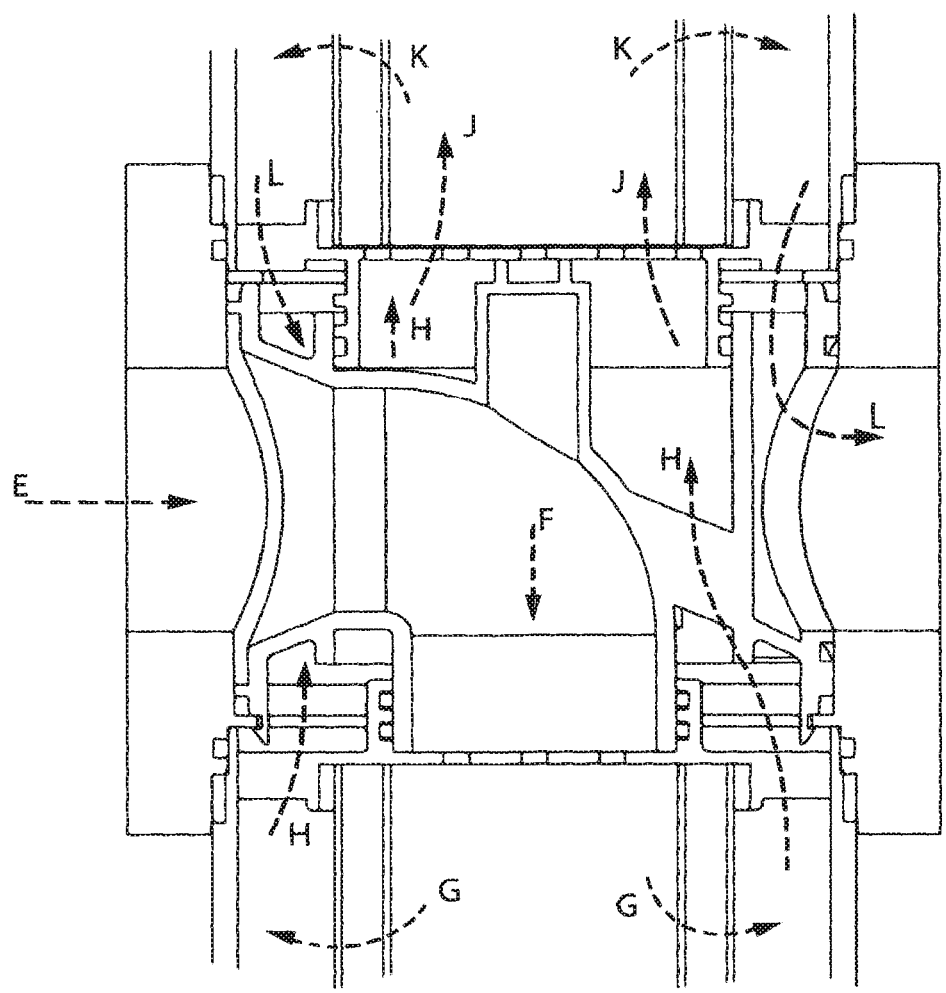
FIG. 5 is a sectional view of a portion of a filter of a further embodiment of the present invention.
Figure 6:
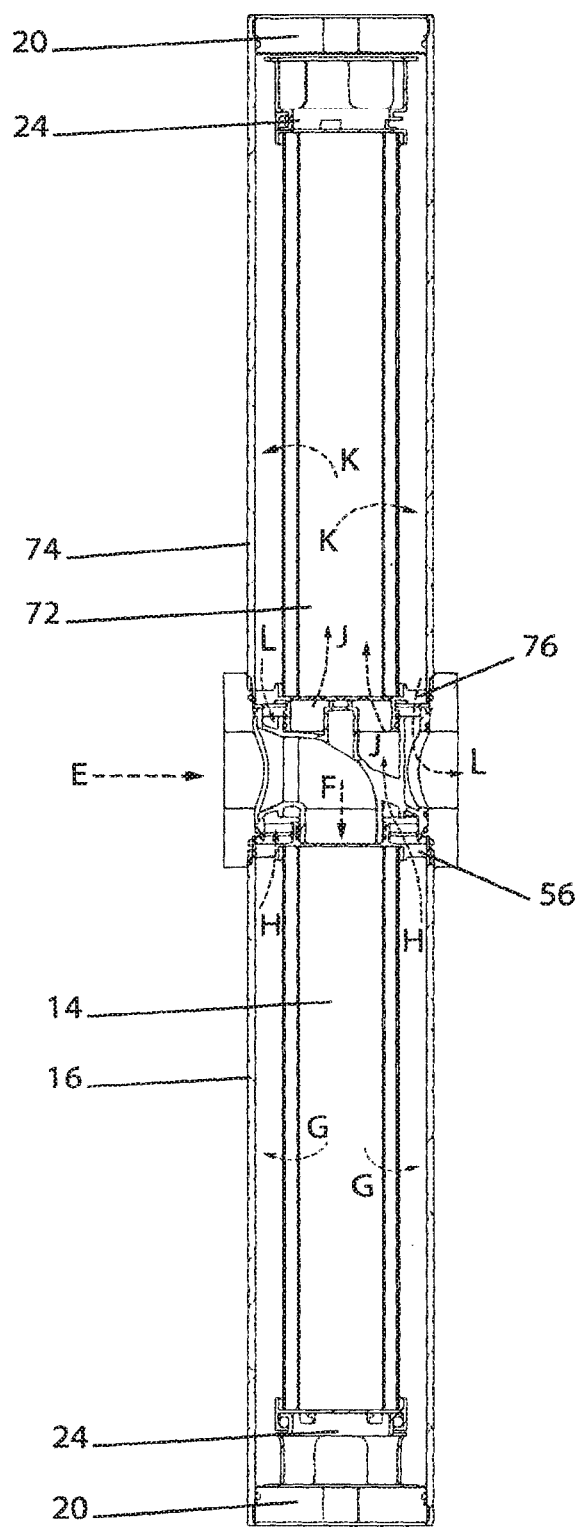
FIG. 6 is a sectional view of the whole of the filter of FIG. 5.
Figure 9:
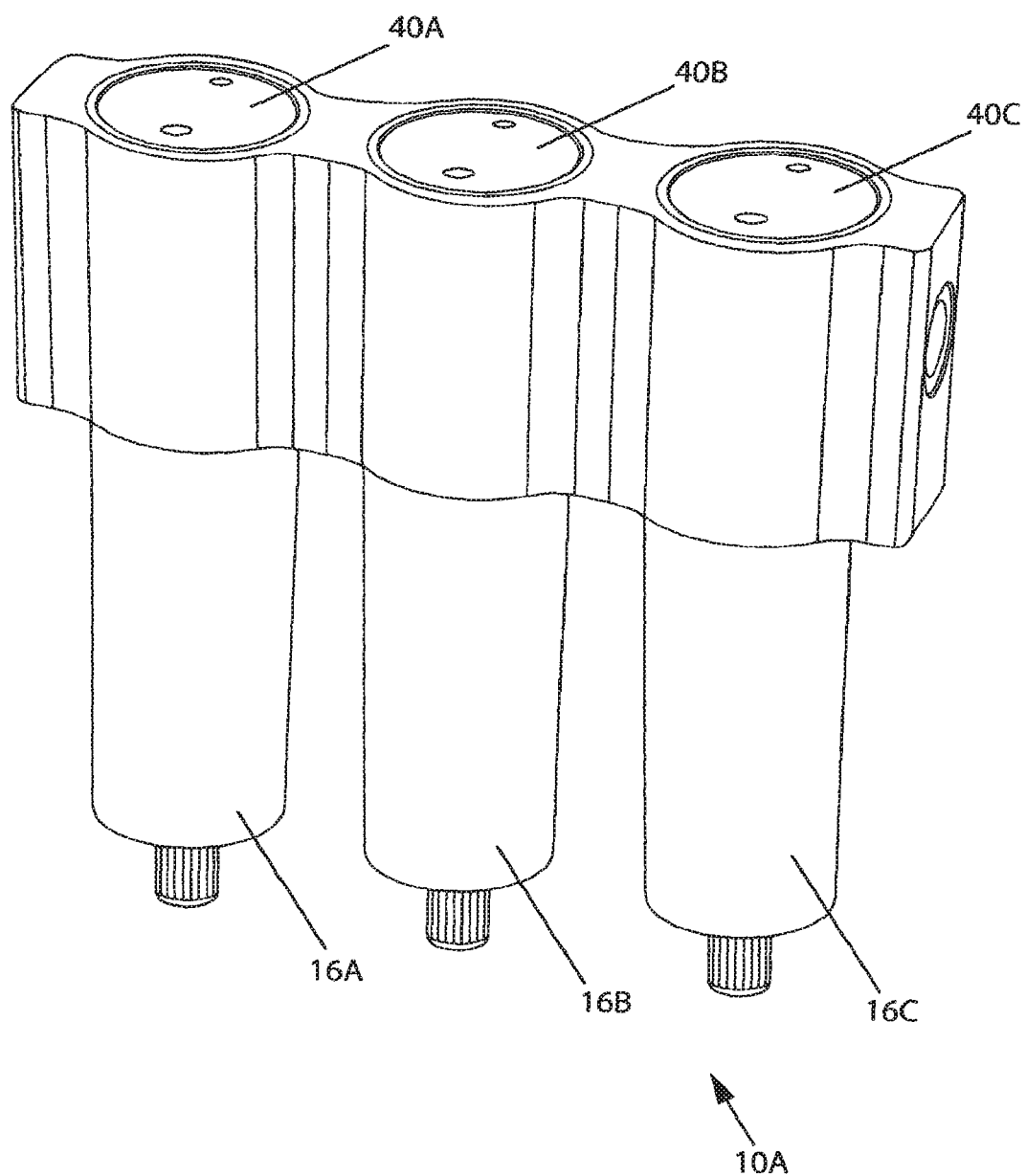
FIG. 9 is a perspective view of a filter device incorporating an end cap including the component of FIG. 7.

Another alternative embodiment is shown in FIGS. 5 and 6 in which the sealing plate 40 is removed and replaced with a second filter element 72 and second filter bowl 74. The embodiment shown in these figures is therefore a two-stage filtering process with the compressed air being first filtered by filter element 14 and then having a second filtration process undertaken by second filter element 72. The filter elements 14 and 72 may be used to filter different contaminants or may be used to apply the same filtration to a particular contaminant into separate stages. In this embodiment a second filter element support portion 76 is attached to second filter element 72 thereby connecting it to insert 50.

Operation of the apparatus of the present invention will now be described. A stream of compressed air is introduced through inlet 46 (in the direction indicated at E) into first conduit portion 52. This directs the stream of air (in direction F) through the grill of holes in filter element support portion 56 and into the central portion of filter element 14. The stream of compressed air will pass along the length of filter element 14 with the compressed air passing through the first filter element wall 22a, the filter media and the second filter element wall 22b (in direction G). The stream of compressed air hits the wall of filter bowl 16 and changes direction. It passes through filter element support portion 56 and into the second conduit 58 (moving in the direction indicated by H and D). It is worth noting that in FIG. 4A the cross-sectional view is cut through a flange 78 which provides structural support but does not prevent the flow of air from the filter bowl 16 to the second conduit 58. Once the stream of air reaches the top of conduit wall 60 it changes direction (indicated at I) and moves towards the outlet 48.

In the embodiment shown in FIGS. 5 and 6, the operation is the same until the stream of compressed air reaches the second conduit 58 (moving in the direction indicated by H and D). Instead of changing direction the stream of air passes through second filter element support portion 76 (in direction J) and into second filter element 72. The stream of air that passes through the second filter element 72 (in direction K) before hitting the wall of second filter bowl 74, changing direction and heading for outlet 48 (in direction L).

Referring to FIGS. 7 to 10A, the apparatus 10A shown therein operates in the same manner as that set out above, except that it operates as a sequence of three filters working in series. The numbering system for components used above has been maintained with the addition of the suffixes A, B and C where multiple components are present. The body portion 26A, shown in FIGS. 7 and 8, allows three filters, 14A, 14B and 14C, to be attached to a single end cap that contains three openings in the form of apertures 27A, 27B and 27C that are formed in the body portion 26A during the extrusion that forms the body portion. The aperture 27A includes a first end aperture 28A and a second end aperture 30A which form opposite ends of the aperture 27A. Similar first and second end apertures 28B, 30B, 28C and 30C form part of the respective apertures 27A, 27B and 27C. Each of the apertures 27A, 27B and 27C has respective inlets and outlets 46A, 48A, 46B, 48B, 46C and 48C. However, the outlet 48A from the aperture 27A leads straight into the inlet 46B of aperture 27B. Likewise the outlet 48B of aperture 27B leads straight into the inlet 46C of aperture 27C. As a result all the inlet and outlets 46A, 48A, 46B, 48B, 46C and 48C are aligned and form a single aperture extending through the body portion 26A perpendicular to the apertures 27A, 27B and 27C. The apertures 27A, 27B and 27C, which are formed as part of the extrusion process, are formed with the extrusion parallel to the axes of these apertures.

Each of the apertures 27A, 27B and 27C contains an insert 50A, 50B and 50C respectively. Each of these inserts is identical, in its operation, to the insert 50 described above. The filter element support portions 56A, 56B and 56C, shown in FIG. 10A, are of a different form than the equivalent support portion 56 shown in FIGS. 1 to 6, although their basic functions are the same.

The apparatus 10A operates by compressed air entering the inlet 46A and being directed by the first conduit of insert 50A to the centre of filter 14A. The compressed air passes through the filter wall and the second conduit of insert 50A directs the compressed air to the outlet 48A. This outlet leads straight into the inlet 48B and the filtration process is repeated through filter 14B. On exiting the second portion of the filter at outlet 48B the stream of compressed air immediately enters the third stage of filtration at inlet 46C, passes through the filter 14C and finally out of the outlet 48C and onto downstream apparatus (not shown).

The filter is 14A, 14B and 14C could be identical or could provide progressively finer filtering. The embodiment shown in FIGS. 9 and 10A includes 3 filters with the second end apertures 30A, 30B and 30C sealed with respective sealing plate 40A, 40B and 40C. However, these seeming plates could be replaced with further filters and filter bowls in the manner shown in FIGS. 5 and 6 thereby providing a six stage filtration process.

Although not shown in the figures, it should be noted that further apertures can be machined into the extruded body portion to allow the inclusion of additional components. For example, with reference to FIGS. 7 and 8, threaded apertures can be machined into the front face of the body portion 26A and a pressure sensor with output display can be attached to the threaded aperture extending into the space within the body portion 26A. Apertures in the front face can extend through the body portion 26A at the narrower points providing access into the inlet and outlets 46A, 48A, 46B, 48B, 46C and 48C. Such a pressure sensor could additionally provide data to a remote data logging device. If such pressure sensors are put on either side of a component (in other words if a pressure sensor extends into the space created by outlet 48A and inlet 46B and a further pressure sensor extends into the space created by outlet 48B and inlet 46C) the pressure drop across that component can be calculated. This in itself can be a useful measure of the efficiency at which the component is working. For example, where a component is a filter it can be used to determine whether the filter is becoming blocked.

For some components, such as a water separation device there is a linear relationship between pressure drop and flow rate. As a result, measuring the pressure drop across such a component can be used to provide an estimate of the compressed air flow rate. This principle works for any component which has a linear relationship between pressure drop and flow rate which is typically any component that does not have pores that become blocked.

Other examples of additional components, instead of the above mentioned pressure sensors, which can be inserted into these further apertures include: soft start valves (which limit the rate of change of pressure when a valve opens); lockout valves (a valve which can be padlocked shut for safety); pressure switches; safety pressure relief valve; safety shut off valves (for maintaining or relieving pressure); and proportional regulators. These apertures can also be used to take a stream of compressed air to add additional outlet. For example, an apparatus such as that shown in FIG. 9 may include a lubricator, which adds small quantities of lubricating oil to the compressed air, instead of the last filter bowl 16C. However, the lubricator may not be required at all times and an aperture in the front face of body portion 26A between outlet 48B and inlet 46C allows the compressed air to be removed from the apparatus 10A before entering the lubricator. By inserting a valve and an outlet line into the aperture formed in the front face of body portion 26A the use of the lubricator becomes optional or separate streams of lubricated and none lubricated compressed air can be created.

Figure 11:
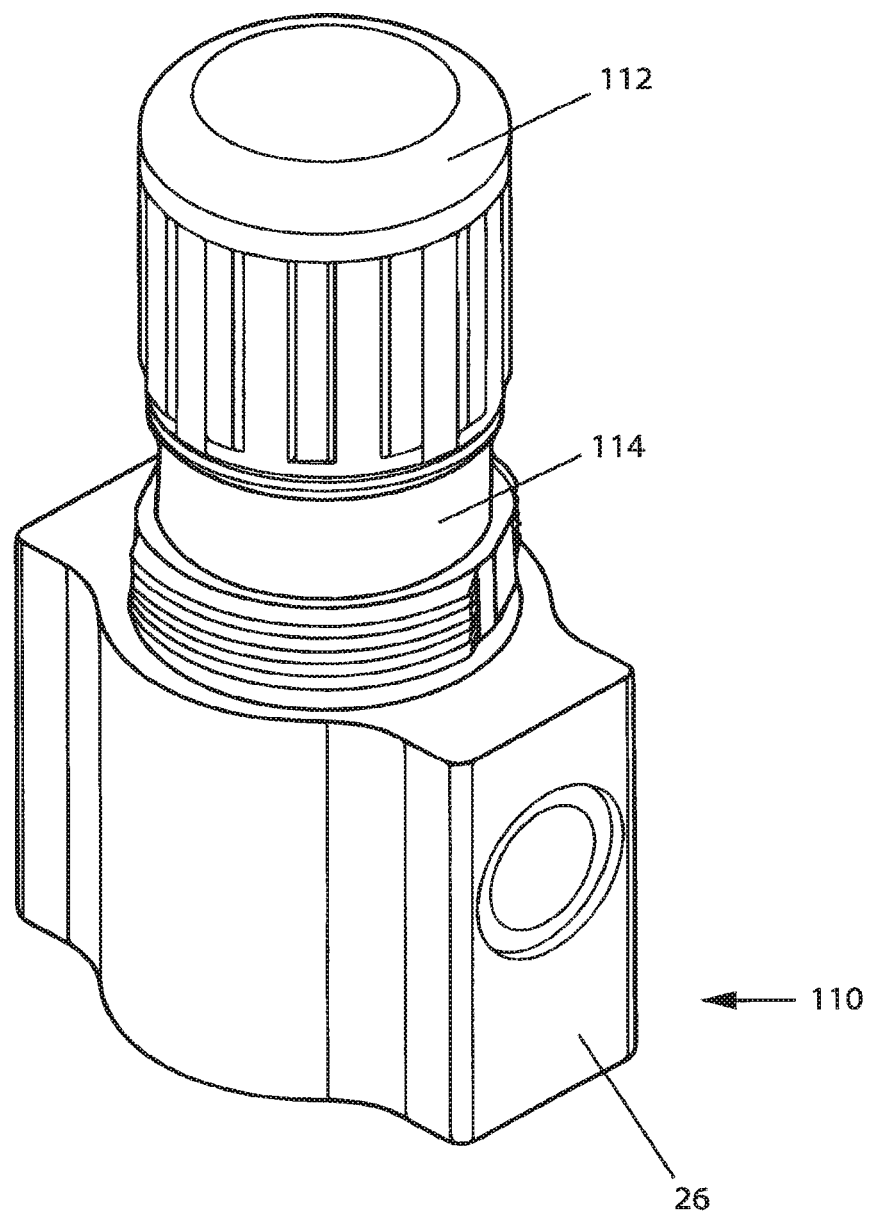
FIG. 11 is a plan view of a pressure regulator.
Figure 12:
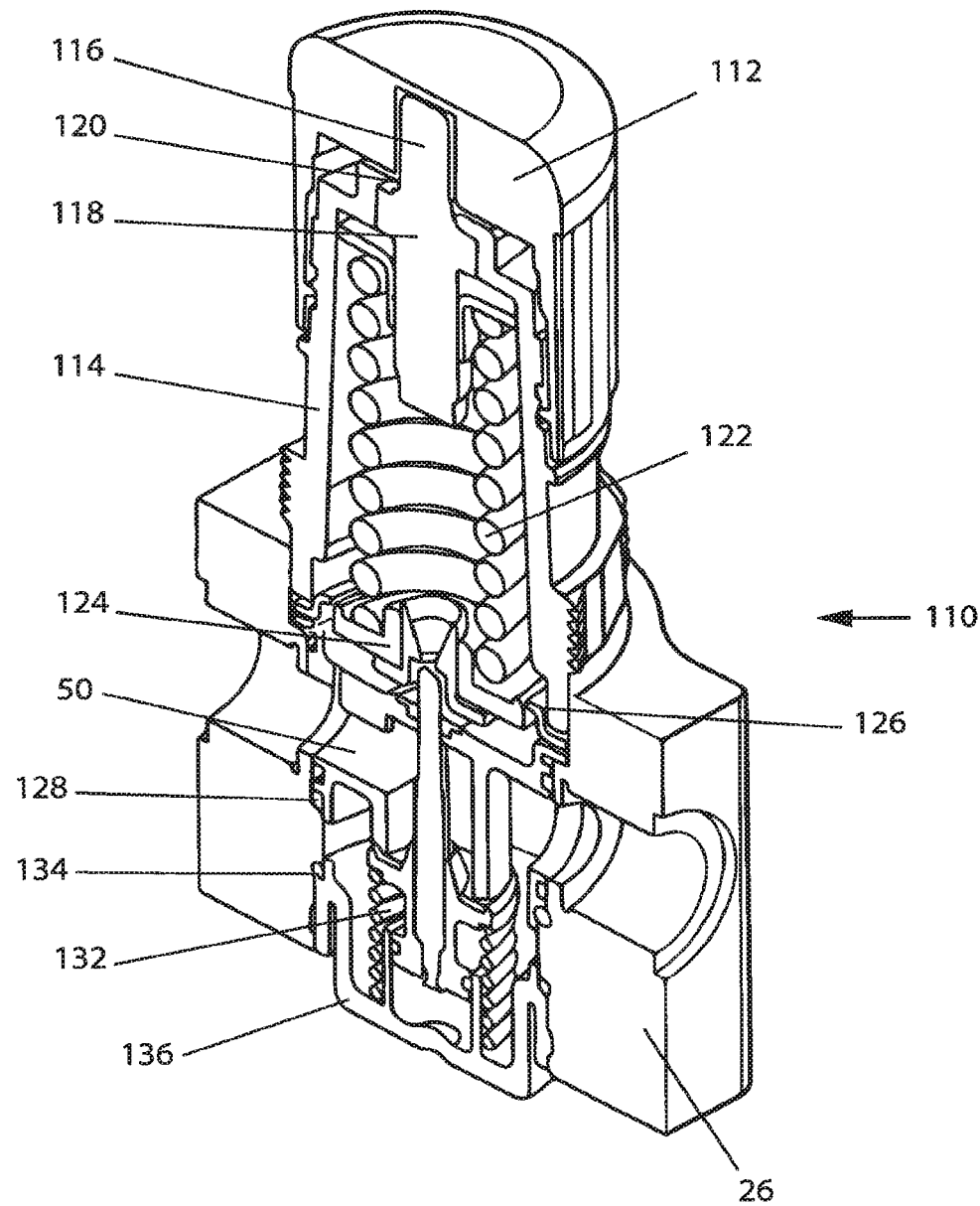
FIG. 12 is a sectional view of the pressure regulator of FIG. 11.
Figure 13:
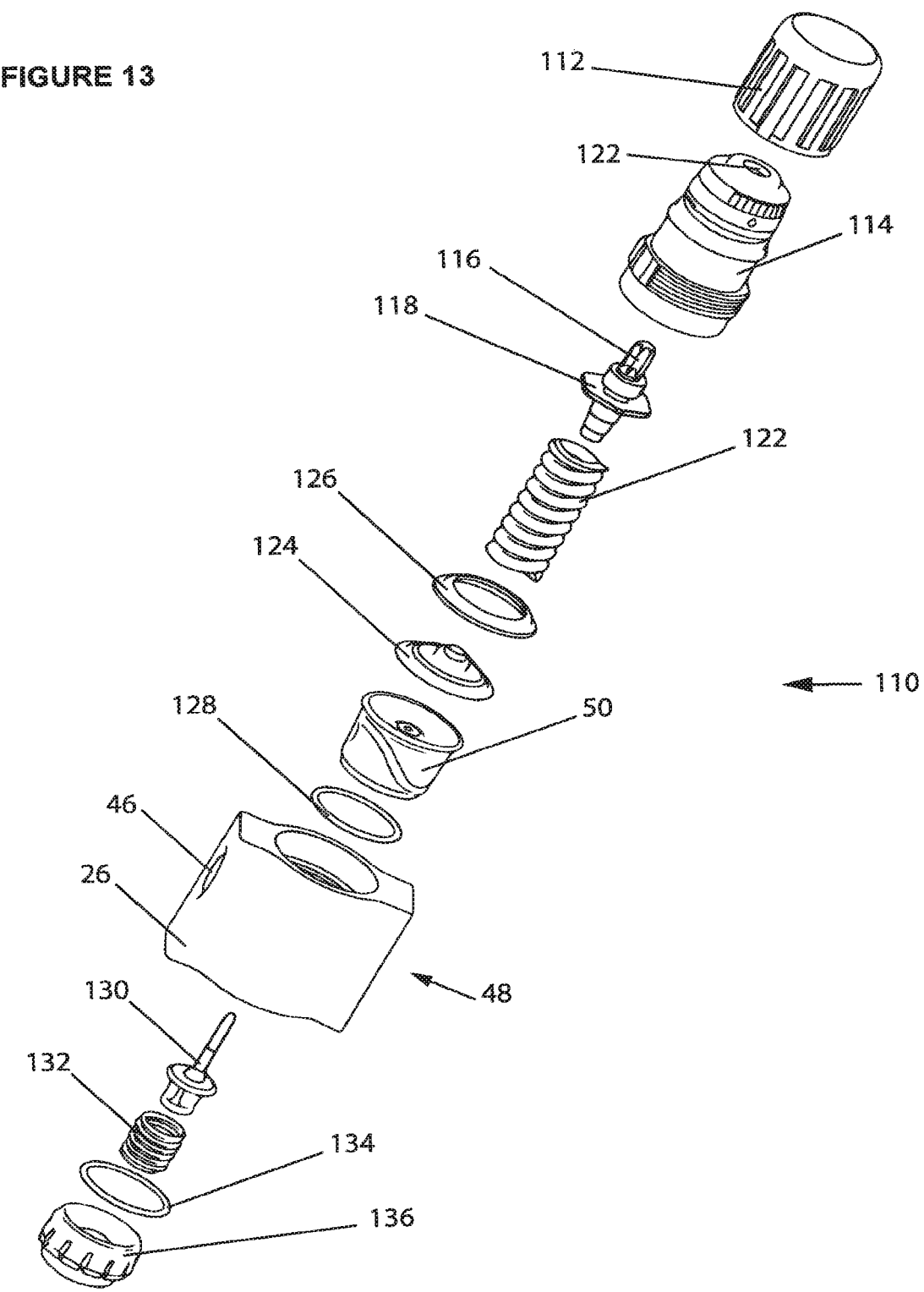
FIG. 13 is an exploded view of the pressure regulator of FIG. 11.

A further alternative is shown in FIG. 10B, which operates in the same manner as that shown in FIG. 10A except that the first filter element 14A and first filter element support portion 56A have been replaced with a water separator 57A. This water separator operates by speeding up the airflow and directing it radially outwards towards the wall of bowl 16A. It should be noted that the orientation of the insert 50A is the reverse of that of 50B and 50C. It is also the case that the filter head 26A can be used with other components. For example, a single filtration stage could be used, for example in aperture 27A and the other aperture is (27B and 27C) can contain other components used in the preparation of compressed gas. These components include, but are not limited to, a lubricator which creates a fine mist of lubricant into the stream of compressed air. Another such component is a regulator to regulate the air pressure. Such a regulator can include a control valve and a pressure gauge which could be located in the ceiling end plate 40.

example of a pressure regulator is shown in FIGS. 11 to 13. This regulator, indicated generally at 110, includes the end cap body portion 26 and insert 50, together with other components of this compressed gas preparation assembly 110. These other components, which will be familiar to person skilled in the art, include the manually operable adjusting knob 112 which is moulded from plastic. This sits on top of a diecast aluminium bonnet 114 and an end portion 116 of an adjusting screw assembly 118 extends through an aperture 120 in the bonnet 114 to engage a receiving portion (not shown) in the adjusting knob 112. A regulator mainspring 122 also engages the adjusting screw assembly 118. A convoluted diaphragm assembly 124 and diaphragm slip ring 126 are located between the bonnet 114 and insert 50. As can be seen from FIG. 12 the bonnet 114 extends partially into body portion 26. An O-ring 128 seals the base of insert 50 relative to the body portion 26 and for further components, a main valve assembly 130, valve spring 132, second O-ring 134 and a molded plastic valve plug 136 are connected to the other end of the body portion 26. The pressure regulator operates by air (referred to as the primary air) entering through the inlet 46 but is prevented from passing through the regulator 110 by the combined forces of the primary air and the valve spring 132. When the adjusting knob 112 is turned, causing the rotation of end portion 116 of adjusting screw assembly 118 the mainspring 122 exerts a force against the diaphragm hundred and 24 causing the main valve assembly 130 to move the valve downwards away from the seat allowing the air to flow past the seat to the secondary side of the regulator. The air continues to flow until the secondary pressure overcomes the force exerted above the diaphragm by the regulating spring. The diaphragm then moves upward, compressing the spring and allowing the diaphragm to reseat and stop the airflow.

Referring to FIGS. 14 to 17, a gas treatment assembly 80 is provided for treating a supply of compressed gas using pressure swing adsorption. The assembly 80 has a tubular media containing portion 82, which is formed by extrusion and has external threads 84 formed therein and contains a gas treatment media such as a desiccant for the removal of water from the stream of compressed gas. An example of a suitable desiccant is a bundle of porous desiccant tubes of the type described in WO2008/110820 and WO2007/007051, although other types of desiccant material and other gas treatment media may also be used in this assembly.

The assembly 80 is provided with a pair of end caps 86 and 88. Each end cap has an extruded body portion 87 and 89. An internal thread 90 is formed in each body portion 87 and 89 and is sized to engage the external thread 84 of media containing portion 82. Suitable O-ring seals, as shown in FIG. 7 and indicated at 92, are provided to seal the junction between the end caps 86 and 88 and the media containing portion 82. Each end cap also has a closure 94 that is provided with an external thread 96 that engages an internal thread 98 in the body portions 87 and 89 and is sealed with an O-ring seal 100.

Each of the end caps 86 and 88 is provided with an inlet 102 or outlet 104. In the embodiment shown in FIGS. 14 and 15 the inlet 102 and outlet 104 are provided in the closures 94 and a formed by machining a threaded aperture therein. In the embodiments shown in FIGS. 16 and 17 the inlet 102 and outlet 104 are provided in a thickened portion 106 that is formed in the extruded body portions 86 and 88. In the embodiments shown in FIGS. 14 and 15 it is clear that this thickened portion 106 is not an essential feature since the inlet 102 to an outlet 104 are formed in the closures 94.

Figure 14:
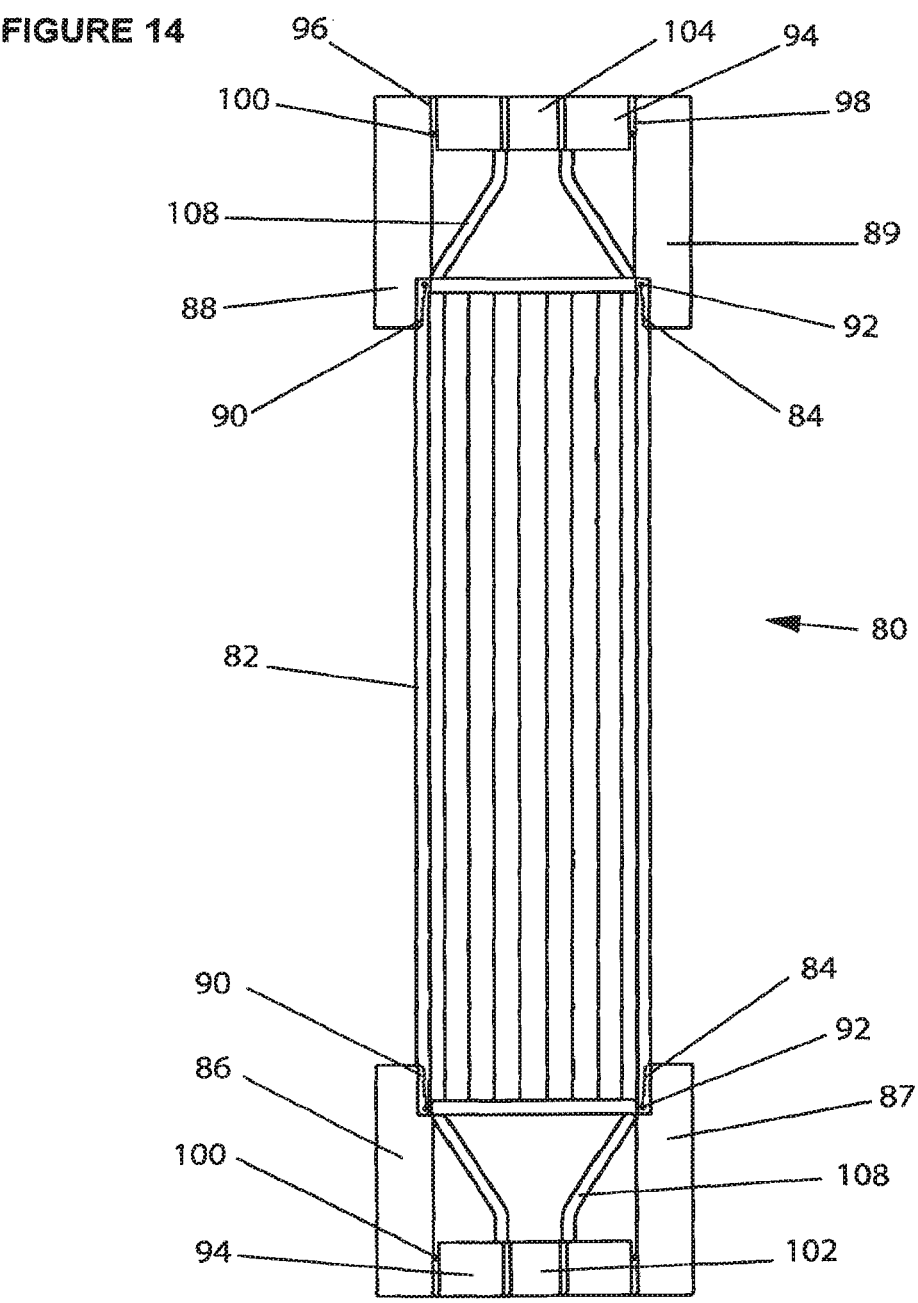
FIGS. 14 and 15 are sectional and end views of a gas treatment assembly of the present invention.
Figure 15:
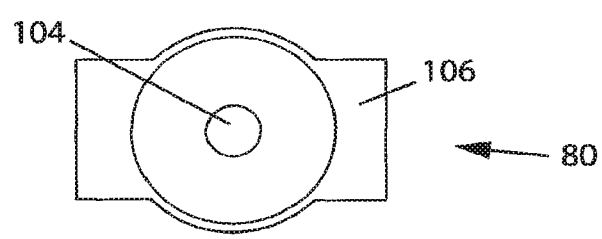
Figure 16:
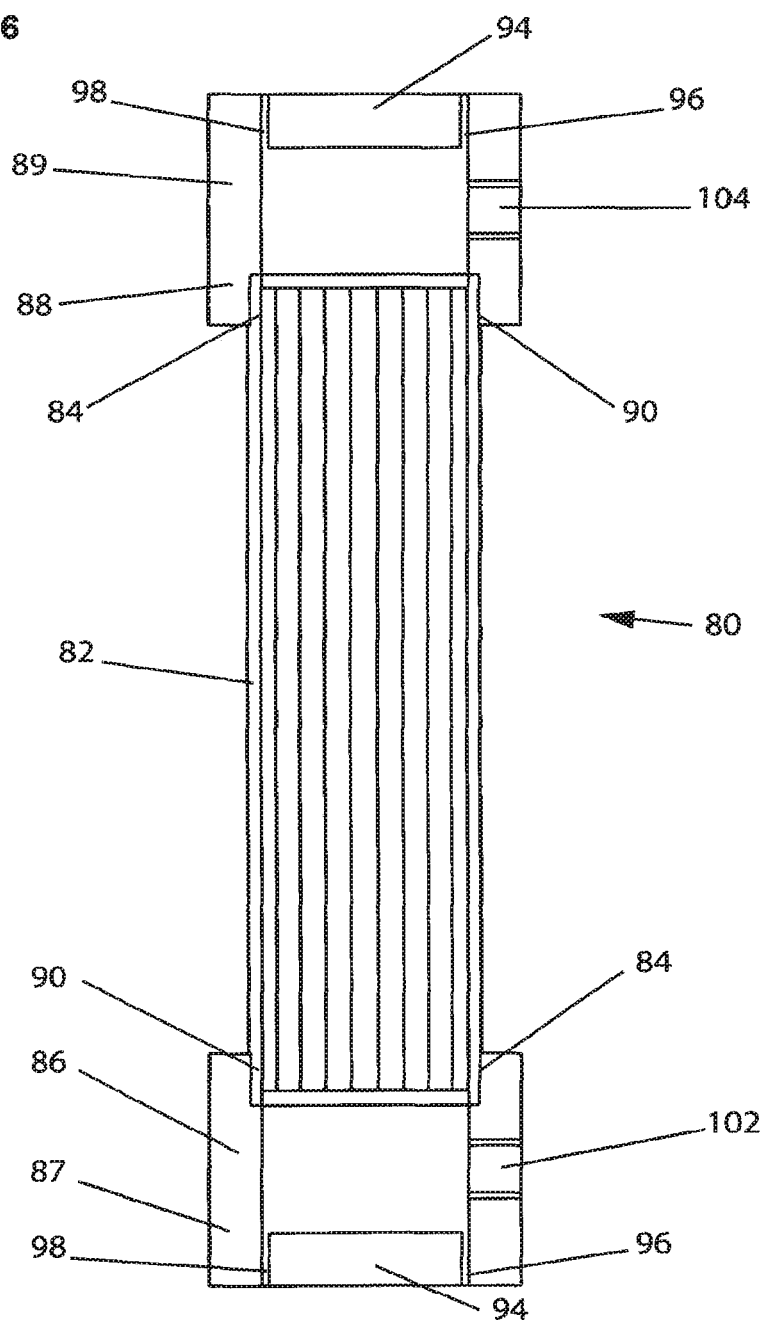
FIGS. 16 and 17 are sectional and end views of an alternative gas treatment assembly of the present invention.
Figure 17:
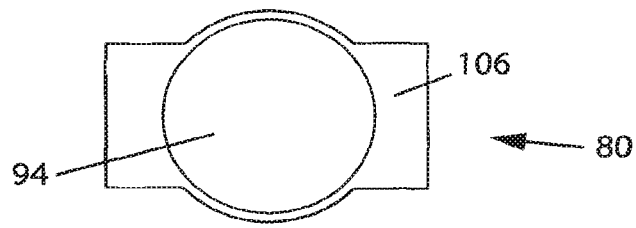

In the embodiment shown in FIGS. 14 and 15 inserts 108 are provided to direct the flow of air evenly from the inlet 102 to the entrance to the media in the media containing portion 82 and from the exit from the media in the media containing portion 82 to the outlet 104. Similar inserts are not shown in the embodiments shown in FIGS. 9 and 10. However, an insert can be used although it must be shaped to direct the flow evenly through the 90° turn from the inlet 102 to the media containing portion 82 and again to the outlet 104.

It will be appreciated by person skilled in the art that the above embodiments have been described by way of example only and not in any limitative sense, and that various alterations and modification are possible without departure from the scope of protection which is define by the appended claims. For example, the device shown in FIGS. 14 to 17 can be used as a static adsorber. Such a device has a cartridge containing adsorbent material through which a stream of compressed air is passed. This type of adsorber is for use with low-level contaminants or a contaminant that cannot be regenerated from the adsorbent material and the cartridge is simply replaced once its adsorbent capacity is filled.

The invention claimed is:

1. An end cap for an assembly used in the preparation of compressed gas, the end cap comprising:
   a substantially tubular body portion formed by extrusion, said body portion having a plurality of apertures formed therein, the apertures including a first end aperture for attachment to a first gas preparation component, a second end aperture for attachment to a second gas preparation component or to at least one sealing device and first and second sidewall apertures for acting as an inlet and an outlet for said filter assembly;
   and at least one insert for location in said body portion between said first and second end apertures and having a first conduit portion for directing a stream of gas from said inlet to said first gas preparation component through said first end aperture, wherein said insert further comprises a second conduit portion for directing said stream of gas, having passed through said first gas preparation component, from adjacent said first gas preparation component in a direction away from said first gas preparation component, said second conduit portion comprising a conduit wall extending at least partially beyond said outlet in said direction.

2. An end cap according to claim 1, wherein said insert further comprises a second conduit portion for directing said stream of gas from said second gas preparation component through said second end aperture to said outlet when said end cap is attached to said second gas preparation component.

3. An end cap according to claim 1, wherein an edge of said conduit wall, distal of said first gas preparation component, engages said second gas preparation component.

4. An end cap according to claim 1, wherein at least a portion of said conduit wall is annular.

5. An end cap according to claim 1, wherein said insert comprises fixing members for fixing said insert into said body portion.

6. An end cap according to claim 1, wherein said body portion comprises first and second internally threaded portions adjacent said first and second and apertures and adapted to engage externally threaded portions of said gas preparation component or sealing device.

7. An end cap according to claim 1, wherein a portion of said first conduit extends around said inlet.

8. An end cap according claim 1, wherein a portion of said second conduit extends around said outlet.

9. An end cap according to claim 1, wherein at least one of said first gas preparation component or second gas preparation component comprises at least one filter bowl and at least one filter element.

10. An end cap for a filter assembly, the end cap for attaching to at least one filter element and at least one filter bowl, the end cap comprising:
a body portion having a substantially tubular body portion formed by extrusion and a plurality of apertures formed therein, the apertures including a first end aperture for attachment to a first filter bowl, a second end aperture for attachment to a second filter bowl or at least one sealing device and first and second sidewall apertures for acting as an inlet and an outlet for said filter assembly; and
at least one insert for location in said body portion between said first and second end apertures and having a first conduit portion for directing a stream of gas from said inlet to a first filter element through said first end aperture, the at least one insert further having at least one second conduit portion for directing said stream of gas, having passed through said first filter element, from adjacent said first filter element in a direction away from said first filter element, said second conduit portion comprising a conduit wall extending at least partially beyond a portion of said filter and a portion of said outlet in said direction.

11. An end cap according to claim 10, wherein an edge of said conduit wall, distal of said first filter element, engages said second filter element.

12. An end cap according to claim 10, wherein at least a portion of said conduit wall is annular.

13. An end cap according to claim 10, wherein said insert comprises fixing members for fixing said insert into said body.

14. An end cap according to claim 10, herein said second conduit portion directs said stream of gas from said second filter element through said second end aperture to said outlet when said end cap is attached to said second filter bowl.

15. An end cap according to claim 10, wherein said body portion comprises first and second internally threaded portions adjacent said first and second and apertures and adapted to engage externally threaded portions of said filter bowl or sealing device.

16. A filter assembly used in the preparation of compressed gas, the assembly comprising:
an end cap comprising:
a substantially tubular body portion formed by extrusion, said body portion having a plurality of apertures formed therein, the apertures including a first end aperture for attachment to a first gas preparation component, a second end aperture for attachment to a second gas preparation component or to at least one sealing device and first and second sidewall apertures for acting as an inlet and an outlet for said filter assembly;
at least one insert for location in said body portion between said first and second end apertures and having a first conduit portion for directing a stream of gas from said inlet to said first gas preparation component through said first end aperture and a second conduit portion for directing said stream of gas, having passed through said first gas preparation component, from adjacent said first gas preparation component in a direction away from said first gas preparation component, said second conduit portion comprising a conduit wall extending at least partially beyond said outlet in said direction; and
said first preparation component.

17. The filter assembly according to claim 16 further comprising:
a pressure swing absorption device for treating said gas.

18. A method of forming an end cap for an assembly used in the preparation of compressed gas, comprising the steps:
forming by extrusion a substantially tubular body portion;
machining into said body portion a plurality of apertures including a first end aperture for attachment to a first gas preparation component, a second end aperture for attachment to a second gas preparation component or to at least one sealing device and first and second sidewall apertures for acting as an inlet and an outlet for said filter assembly; and
inserting through said first end aperture and locating in said body portion between said first and second end apertures at least one insert having a first conduit portion for directing a stream of gas from said inlet to said first gas preparation component through said first end aperture and a second conduit portion for directing said stream of gas, having passed through said first gas preparation component, from adjacent said first gas preparation component in a direction away from said first gas preparation component, said second conduit portion comprising a conduit wall extending at least partially beyond said outlet in said direction.

19. A method according to claim 18, further comprising locating a sealing device in one of said end apertures.

* * * * *